United States Patent [19]

Okita

[11] Patent Number: 5,412,984
[45] Date of Patent: May 9, 1995

[54] VESSEL SPEED MEASURING SYSTEM FOR THE MARINE PROPULSION MACHINE

[75] Inventor: Ryozo Okita, Hamamatsu, Japan

[73] Assignee: Sanshin Kogyo Kabushiki Kaisha, Hamamatsu, Japan

[21] Appl. No.: 860,052

[22] Filed: Mar. 20, 1992

[30] Foreign Application Priority Data

Apr. 2, 1991 [JP] Japan .................................. 3-096344

[51] Int. Cl.$^6$ ............................................. G01C 21/10
[52] U.S. Cl. ............................................ 73/182; 440/2
[58] Field of Search ....................... 73/182, 181; 440/2

[56] References Cited

U.S. PATENT DOCUMENTS

| | | | |
|---|---|---|---|
| 4,821,567 | 4/1989 | Nakamura et al. | 73/182 |
| 4,914,945 | 4/1990 | Nakamura et al. | 73/182 |
| 4,914,946 | 4/1990 | Nakamura et al. | 73/182 |
| 4,916,644 | 4/1990 | Nakamura et al. | 73/182 |
| 4,932,249 | 6/1990 | Nakamura et al. | 73/182 |
| 4,956,997 | 9/1990 | Nakamura et al. | 73/182 |
| 5,004,439 | 4/1991 | Onoue | 73/182 |

*Primary Examiner*—Donald O. Woodiel
*Attorney, Agent, or Firm*—Knobbe, Martens, Olson & Bear

[57] ABSTRACT

The present invention details several embodiments of a vessel speed measuring and indicating system, having a pressure intake port within a leading edge of a lower outboard portion of a vessel propulsion arrangement, which is structured to prevent debris, such as driftwood or the like, from entering and becoming lodged within the pressure intake port during operation of the vessel, so that the vessel speed can be accurately measured and displayed. The constructions detailed herein include a projection which is formed in the vicinity of the pressure intake port. The projection may be slightly above the pressure intake port, below the pressure intake port, or both above as well as below the pressure intake port.

24 Claims, 6 Drawing Sheets

VESSEL SPEED MEASURING SYSTEM FOR THE MARINE PROPULSION MACHINE

BACKGROUND OF THE INVENTION

This invention relates to an improved watercraft speed measuring arrangement employable with a watercraft propulsion unit. Specifically, the invention provides a vessel speed measuring system which will not be rendered inoperable or inaccurate in its performance if the associated propulsion unit strikes a piece of debris (e.g., driftwood, or the like) during operation of the watercraft upon a body of water.

It has been known to employ display meters in connection with water vessels in order to communicate various operational data to an operator. Such various meters might include a speedometer, a clock or timer, and or a trip meter or odometer. It has been the common practice to employ some type of sensing device from which each meter receives the operational data which it then conveys in an appropriate manner to an operator. The sensing devices are oftentimes positioned remotely from their respective display meters. The display meters are positioned so that they may be readily observed by an operator. A suitable communication line relays the sensed data at each sensor to its respective meter so that the particular operational data can be displayed in an appropriate manner.

Since the present invention involves a speed indicating device, an example of a known prior speed indicating arrangement will now be described. It has been known to provide a Pitot tube (i.e., a device used to measure the total pressure of a fluid stream) within a port located within a lower outboard portion of a watercraft propulsion unit. The lower outboard portion is usually streamlined in horizontal cross-section (e.g., teardrop-shaped) and has a generally vertically disposed forward region which basically forms a straight line along its vertical length. In an effort to accurately sense the pressure at such a structure, the port has been arranged so that it opens forwardly (i.e., in the advancing direction of an associated watercraft) within the leading edge of the lower outboard portion, and so that it is positioned beneath the hull of the watercraft, in order that movement of the watercraft across a body of water will cause the Pitot tube to encounter a pressure force as water impinges upon it. This pressure force is subsequently transmitted to a pressure detector which is built into the speedometer. Such transmission may occur through any suitable conduit system communicating the port opening to the pressure detector of the speedometer. The pressure detector measures the pressure force and converts it into a quantity representative of the vessel speed, which quantity is then shown upon the display of the speedometer in any suitable fashion (e.g., as digital numerical figure or by a pivotal needle situated upon a calibrated background or scale).

The above-described known vessel speed detecting arrangement has proved to be quite satisfactory in providing an operator with vessel speed information under many operational circumstances. However, floating, or somewhat submerged, debris (e.g., driftwood, or the like) can cause the known arrangement to malfunction so that it cannot provide a reliable and accurate measurement or, under certain circumstances, render it totally inoperative. Specifically, problems can arise with such an arrangement when debris hits upon the lower outboard portion of the propulsion unit during navigation. In some instances, the debris may forcefully contact the pressure intake port, and a piece of the debris may enter the port and become inadvertently lodged therein. Consequently, under such circumstances, the pressure intake port will not be able to incur, and relay, the total pressure value which it would otherwise be subjected to during operation, as the lodged debris may block, in whole or in part, the port. Thus, the speedometer will show a lower speed value than the actual speed value of the vessel, or possibly no speed value at all.

While such a problem may be overcome by having an operator physically remove the lodged debris from within the pressure intake port, such removal can be difficult, for obvious reasons (especially if the operator attempts to perform such a task by leaning overboard and reaching to the pressure intake port).

Therefore, it is a principal object of the present invention to provide an improved vessel speed measuring system for a marine propulsion arrangement.

It is additionally an object of the invention to provide a vessel speed measuring and indicating system, having a pressure intake port within a leading edge of a lower outboard portion of the propulsion arrangement, which is structured to prevent debris, such as driftwood or the like, from entering and becoming lodged within the pressure intake port during operation of the vessel, so that the vessel speed can be accurately measured and displayed.

SUMMARY OF THE INVENTION

The present invention is adapted to be embodied in a vessel speed measuring and indicating arrangement. The arrangement includes a propulsion unit, an outboard portion of the propulsion unit, an intake port formed along a forward region of the outboard portion, an operator interfacing display assembly, and a line communicating the intake port with the display assembly. The improvement comprises a debris blocking projection formed in the vicinity of the intake port. The debris blocking projection extends laterally forward of the intake port. The debris blocking projection is operable to prevent pieces of debris from entering and lodging within the port.

DETAILED DESCRIPTION OF THE PREFERRED EMBODIMENTS

Figure 1:
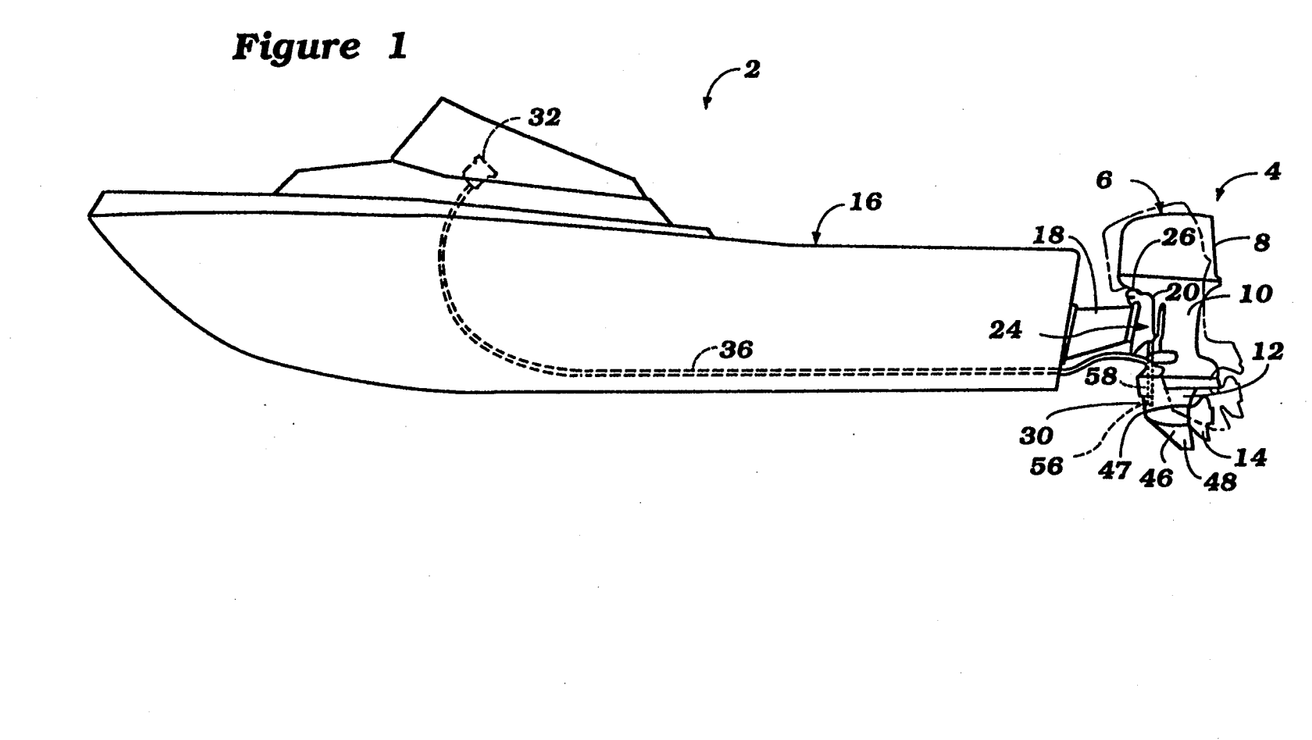
FIG. 1 is a side elevational view of a watercraft constructed in accordance with the invention.

Referring initially to FIG. 1, a watercraft, as a suitable and preferred environment for practicing the present invention, is shown in side elevational view. The watercraft is denoted generally by the reference numeral 2. An outboard type propulsion unit, for propelling the watercraft across a body of water, is shown in combination with the watercraft 2, and is denoted generally by the reference numeral 4. It is to be understood, however, that the present invention may be utilized with propulsion arrangements of other than the outboard type; for example, the invention would additionally prove extremely useful when utilized in combination with the outboard portion of an inboard-outboard propulsion arrangement. The application of the invention to such an outboard portion of an inboard-outboard propulsion arrangement is believed to be readily obvious to those skilled in the art.

The outboard propulsion arrangement 4 of FIG. 1 includes a powerhead, indicated generally by the reference numeral 6, containing an internal combustion engine (not shown). A protective cowling 8 surrounds the engine. It should be noted that the engine may be of any suitable type; for example, a multi-cylinder reciprocating engine operating on the two-cycle principle. In accordance with conventional outboard motor practice, the engine is disposed so that its output shaft (not shown) rotates about a generally vertically extending axis.

Depending from the powerhead 6, and affixed to it in a known manner, is a drive shaft housing, which is denoted generally by the reference numeral 10. A drive shaft (not shown) is contained within the drive shaft housing 10 and is rotatably supported therein in a suitable manner. The drive shaft extends downwardly from the engine output shaft, through the drive shaft housing 10, and into a lower unit 12 that is affixed to, and depends from, the drive shaft housing 10. Within the lower unit 12, the drive shaft operates a selectively engageable forward, neutral, reverse transmission (not shown) of a known type which, in turn, selectively couples the drive shaft to a generally horizontally disposed propeller shaft (not shown). The propeller shaft, in turn, is operative to drive a propeller 14 for propelling the watercraft 2 across a body of water, as desired. It is to be noted that the drive shaft housing 10 and the lower unit 12 are preferably constructed of aluminum alloy castings.

The outboard propulsion unit 4 is mounted upon a rearward portion of the hull 16 of the watercraft 2, as seen in FIG. 1. Such mounting is accomplished by way of a mounting bracket assembly 18, which is interposed between a rearward portion of the hull 16 and the propulsion unit 4. A steering shaft (not shown) is affixed to the drive shaft housing 10 and is journaled within a swivel bracket 24, so that the propulsion unit 4 can be steered about a generally vertically extending steering axis, indicated by the reference numeral 20. The swivel bracket 24 is, in turn, pivotally supported by means of a tilt shaft 26, and a clamping bracket assembly (not shown in detail), for tilt and trim movement of the outboard motor 4 about a generally horizontally disposed tilt/trim axis, defined by the tilt shaft 26. The clamping bracket may be detachably connected to the mounting bracket 18.

Preferably, the mounting bracket 18 supports the propulsion unit 4 through a hydraulic cylinder arrangement (not shown) suitable for moving the propulsion unit through trim adjustments and for tilting the propulsion unit 4 upwards, substantially clear of the water. Such cylinder arrangement does not allow the propulsion unit 4 to substantially jump up about its tilt axis (26) during normal operation of the watercraft 2 and associated propulsion unit 4. However, the hydraulic cylinder arrangement does permit the propulsion unit 4 to make such a pivotal jump, to a tilted-up state (shown in phantom in FIG. 1), if the propulsion unit 4 should come into a relatively forceful contact with a piece of debris (e.g., driftwood, or the like), along a lower, forward region of the propulsion unit, during forward running of the watercraft 2 within a body of water.

The present invention may employ a Pitot tube type device in measuring the vessel speed. As can be clearly seen from FIG. 1, a pressure intake port 30 is positioned along a lower, leading edge of the outboard motor's lower unit 12. A display meter 32 is positioned at an operational control area, along a forwardly located region of the watercraft 2, in such a way that it is readily readable by an operator. A water pressure communication line 36, in part, communicates the pressure intake port 30 with the display meter 32 and helps to deliver to the meter 32 a pressure signal indicative of the pressure which is sensed at the pressure intake port 30.

Figures 2, 3:
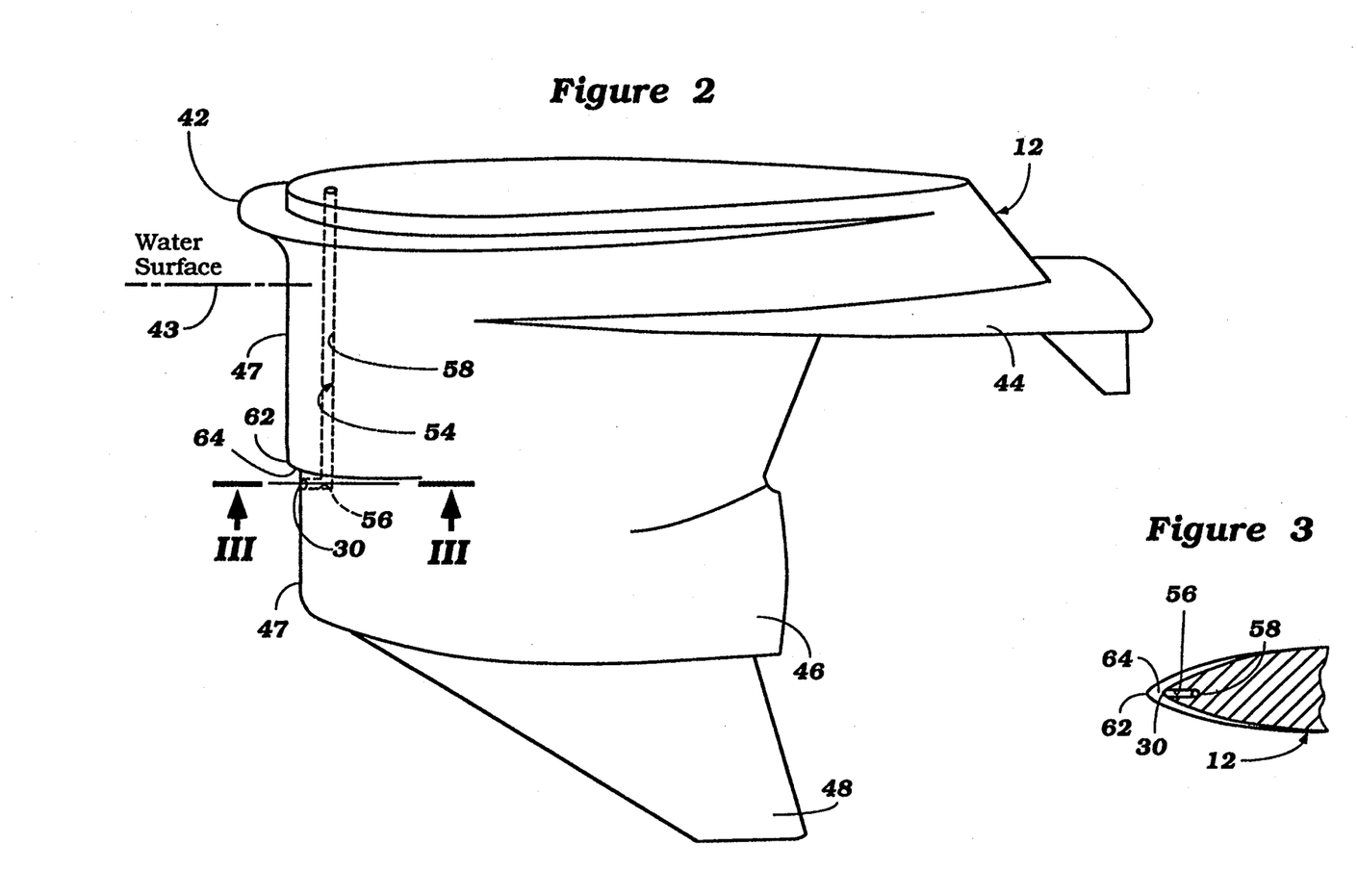
FIG. 2 is an exploded, perspective view showing a lower unit of an outboard motor and a portion of the vessel speed measuring system, as contemplated by a first embodiment of the invention.
FIG. 3 is a cross-sectional view taken along the line III—III of FIG. 2.

Referring now additionally to FIG. 2, it can be seen that the lower unit 12 is provided with an integrally formed, and generally horizontally disposed, splash plate 42 portion located proximate the region whereat the lower unit 12 mates with the driveshaft housing 10. It can be seen that the splash plate is formed a short distance above the water surface line, indicated by the broken line 43. The splash plate 42 is generally formed substantially along a forward portion of the lower unit 12, with respect to the associated watercraft 2. An integrally formed cavitation plate 44 is provided somewhat below the splash plate 42, and is generally formed substantially along a reward portion of the lower unit 12. A basically torpedo shell-shaped region 46, also integrally formed with the lower unit 12, is located below the cavitation plate 44. This torpedo shell-shaped portion 46 houses a bevel gear arrangement (not shown), whereat the drive shaft is coupled to the forward, neutral, reverse transmission, and also accommodates the associated propeller drive shaft (discussed above). The propeller 14 is located just rearwardly of the torpedo shell-shaped portion 46, along a rearward end of the propeller drive shaft.

Both the drive shaft housing 10 and the lower unit 12 are structured so that they are streamlined in a streamlining plane running in a direction from the forwardmost portion of these elements to their rearward most portions. Such streamlining reduces water drag during watercraft operation when these portions are propelled through a body of water. The lower unit 12 is structured to have a nearly vertically disposed forward region which basically forms a straight line along its vertical length. Specifically, the front edge portion 47 of the lower unit 12 is provided with a slight rearward inclination, as shown in the Figures. A vertically disposed plate-like skeg 48 depends from the bottom of the lower unit 12, and is situated so that it lies within the streamlining plane of the drive shaft housing 10 and lower unit 12.

Figure 4:
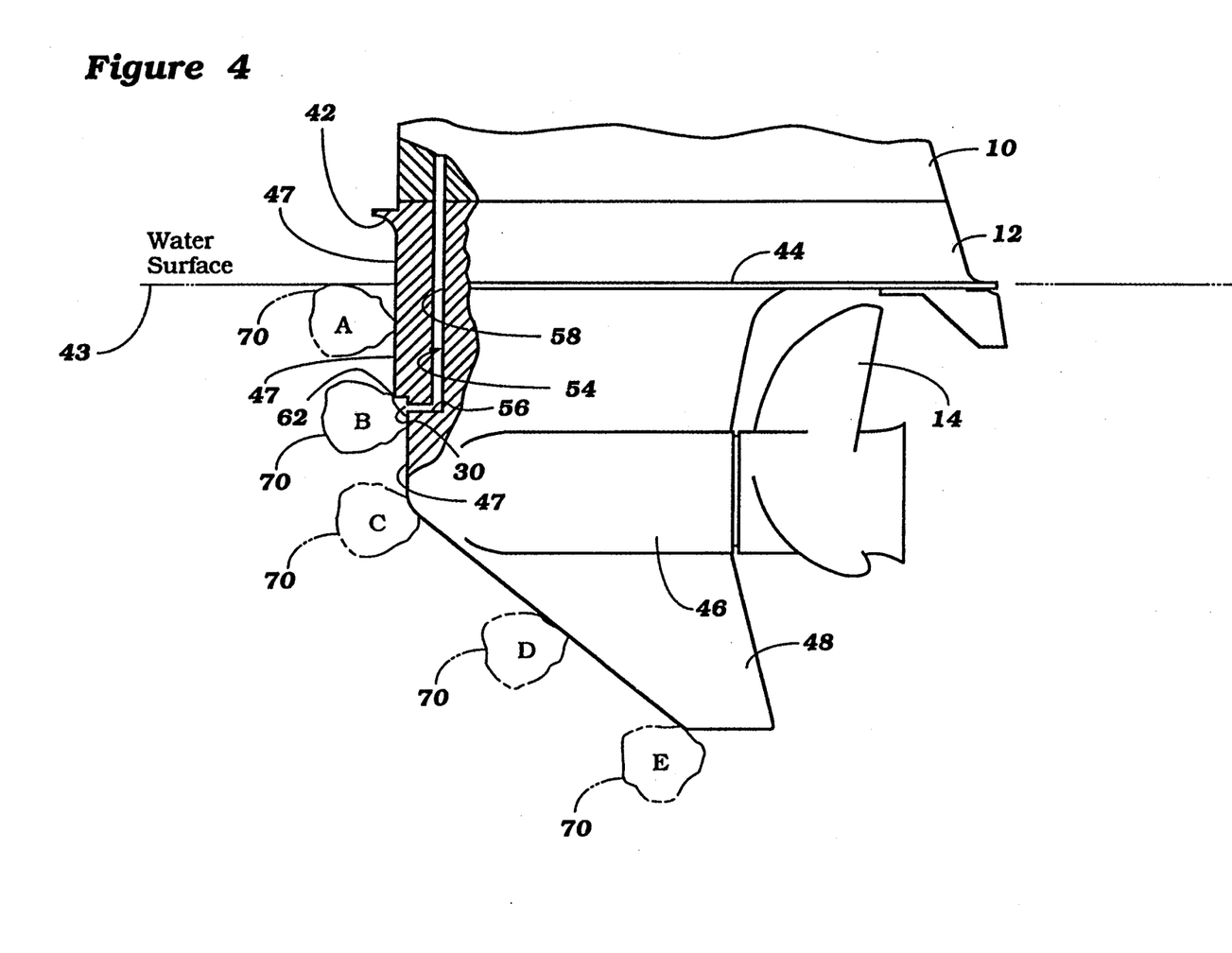
FIG. 4 is an exploded, side view showing a bottom portion of the drive shaft housing in addition to the depending lower unit and a portion of the vessel speed measuring system portion shown in FIG. 2.

Slightly above the torpedo-shell shaped region 46 of the lower unit 12, and along the front edge 47 thereof, the forwardly opening pressure intake port 30 is formed therein. A water pressure conduit 54 extends from the pressure intake port 30 through both the lower unit 12 and the driveshaft housing 10, as best seen in FIG. 4. The water pressure conduit comprises a generally horizontally disposed section 56 which bores rearwardly from the pressure intake port back into the lower unit 12, and a generally vertically disposed section 58 which begins at the rearwardmost portion of the horizontal section 56 and bores upwardly through both the lower unit 12 and the drive shaft housing 10. The water pressure communication line 36, set forth above, is connected to the upper end of the vertical section 58 of the water pressure conduit 54 (See FIG. 1). Together, the water pressure conduit 54 and the water pressure communication line 36 communicates the pressure intake port 30 with the display meter 32 at the operational control area of the watercraft 2.

Next, the general operation of the vessel speed detecting and indicating system will be described.

When the watercraft 2 is advancing in a forward direction, a pressure is incurred at the forwardly opening pressure intake port 30, within the lower unit 12. Such pressure represents the total of the static pressure and the dynamic pressure at this point. This total pressure is transmitted to a pressure detector at the speedometer 32 via the water pressure conduit 54 and the water pressure communication line 36.

The speedometer 32 includes a pressure gauge which comprises a Bourdon tube and an indicator. The indicator is an operator-readable display, comprising a pivotal needle situated against a calibrated background or Scale. Movement of the needle is accomplished according to the total quantity of pressure transmitted from the pressure intake port 30. The position of the needle along the scale indicates the vessel speed to an operator, as is well known. Specifically, the vessel speed is determinable from a known relationship between the total pressure and the vessel speed. The needlescale indicator indicates, in response to the total pressure value encountered, the vessel speed, which is then readable by an operator upon observing the display.

Although the speedometer just described employs a bourdon tube in indicating the vessel speed to an operator; it is to be understood that any other suitable transducer and indicating means may be employed, according to the invention. For example, a piezo-electric element may be utilized which, from the total pressure value, indicates the speed electrically. That is, the total pressure, in such an arrangement, is converted into an electric voltage. The electric voltage, in turn, is measured and subsequently converted into the vessel speed. The vessel speed is then shown upon an indicator. The indicator could be a needle/scale-type, a digital read out-type, or any other suitable, indicator.

In a first embodiment of the invention, as depicted in FIG. 2, a forwardly extending protrusion 62 is formed integrally with the lower unit 12, at a location slightly upward of the pressure intake port 30. The protrusion 62 extends from just above the pressure intake port 30 upwardly, basically forming a straight line, and itself forms the upper part of the front edge 47 of the lower unit 12.

FIG. 3 is a cross-sectional view of the lower unit 12 which is shown in FIG. 2 and is taken along the line III—III thereof. As shown in FIG. 3, the lower unit 12 has a streamlined cross-sectional shape when examined along such a generally horizontal direction, through the pressure intake port 30. Specifically, this streamlined cross-sectional area is identified by hatch marks in FIG. 3.

FIG. 3 also shows the generally horizontally extending bottom portion 64 of the protrusion 62, along the forward region of the lower unit 12. It should readily be appreciated from this Figure that the sectional area of the lower unit 12 taken through its upper region (i.e., through the portion of the lower unit whereat the protrusion is formed, slightly above the pressure intake port 30) is very similar in shape to the sectional area taken through the pressure intake port 30, as identified by the hatch marks. Upon examining the lower unit 12 depicted in Figure 3 from its forwardmost region onward towards its rear, it can be seen that the cross-sectional areas through the regions just discussed gradually blend together, until they ultimately share the same general form.

Next, the operation of the vessel speed measuring system will be described in the context of a situation wherein a portion of the propulsion unit 4 strikes a piece of floating driftwood, along the region of the pressure intake port 30.

With particular reference to FIG. 4, the embodiment of the invention as shown in FIG. 2 is shown in side view. A piece of driftwood, submerged just beneath the water surface 43, is depicted and is indicated by the reference numeral 70. The driftwood 70 is shown contacting the lower unit 12 at several locations (specifically, locations A, B, C, D and E) beneath the water surface 43, as the watercraft 2 is propelled forwardly via the propulsion unit 4. FIG. 4 is meant to illustrate a typical encounter of the lower unit 12 with a piece of driftwood 70, or similar piece of water debris.

Detailing the movement of the driftwood 70, shown in FIG. 4, it can be seen that the driftwood 70 makes initial contact with the forwardly moving lower unit 12 at a location along its leading edge 47 which is somewhat above the pressure intake port 30. This particular point of contact is shown by the driftwood character 70 bearing the reference letter "A". As the lower unit continues its forward movement, the driftwood 70 sinks downwardly and eventually situates in front of the pressure intake port 30. This particular point of contact is shown by the driftwood character bearing the reference letter "B". It is to be noted that although the driftwood 70 (at the location B) passes rather close to the pressure intake port 30, it is not permitted to actually make physical contact with the port 30 due to the structural relationship between the projection 62 and the leading edge 47 of the lower unit 12 just beneath the pressure intake port 30, which protect against such contact. Specifically, the projection 62 and the leading edge 47 just beneath the port 30 act as a blockade against the driftwood 70, holding it forward and outwardly of the port 30, as it passes from the position B and continues downward towards the position indicated by the driftwood character bearing the reference letter "C". The driftwood subsequently travels rearwardly along the positions indicated by the driftwood characters bearing the reference letters "D" and "E", and then ultimately passes clear of the lower unit 12 as the watercraft 2 continues its forward motion.

It should be noted that in the example just described, making reference to FIG. 4, the events are somewhat simplified. That is, the propulsion unit 4 would actually tilt up somewhat about the tilt shaft 26, in a counterclockwise direction (with respect to the illustration of FIG. 4) when the driftwood 70 makes contact with the lower unit 12. The degree of such tilt would, of course, depend upon the force generated by the impact. Accordingly, the driftwood 70 would have more of a horizontal component to its motion as it moves along the leading edge 47 of the lower unit 12. After the driftwood 70 has passed rearwardly of, and beyond, the lower unit 12, the propulsion unit 4 would tilt downwardly in a clockwise fashion, back to its original position. However, for the sake of convenience, FIG. 4 shows the events as if the propulsion unit 4 remained in a stationary, generally vertical position.

Next, second and third embodiments of the invention will be described, with particular reference to FIGS. 5 and 6, respectively. Due to the fact that many of the elements of the invention as described above, in connection with the first embodiment, are the same as those contemplated by the second and third embodiments; like reference characters will be employed below to identify like elements. Specifically, the second and third embodiments will be described in detail, employing unique reference characters, where they differ from the first embodiment, as set forth above.

Figure 5:
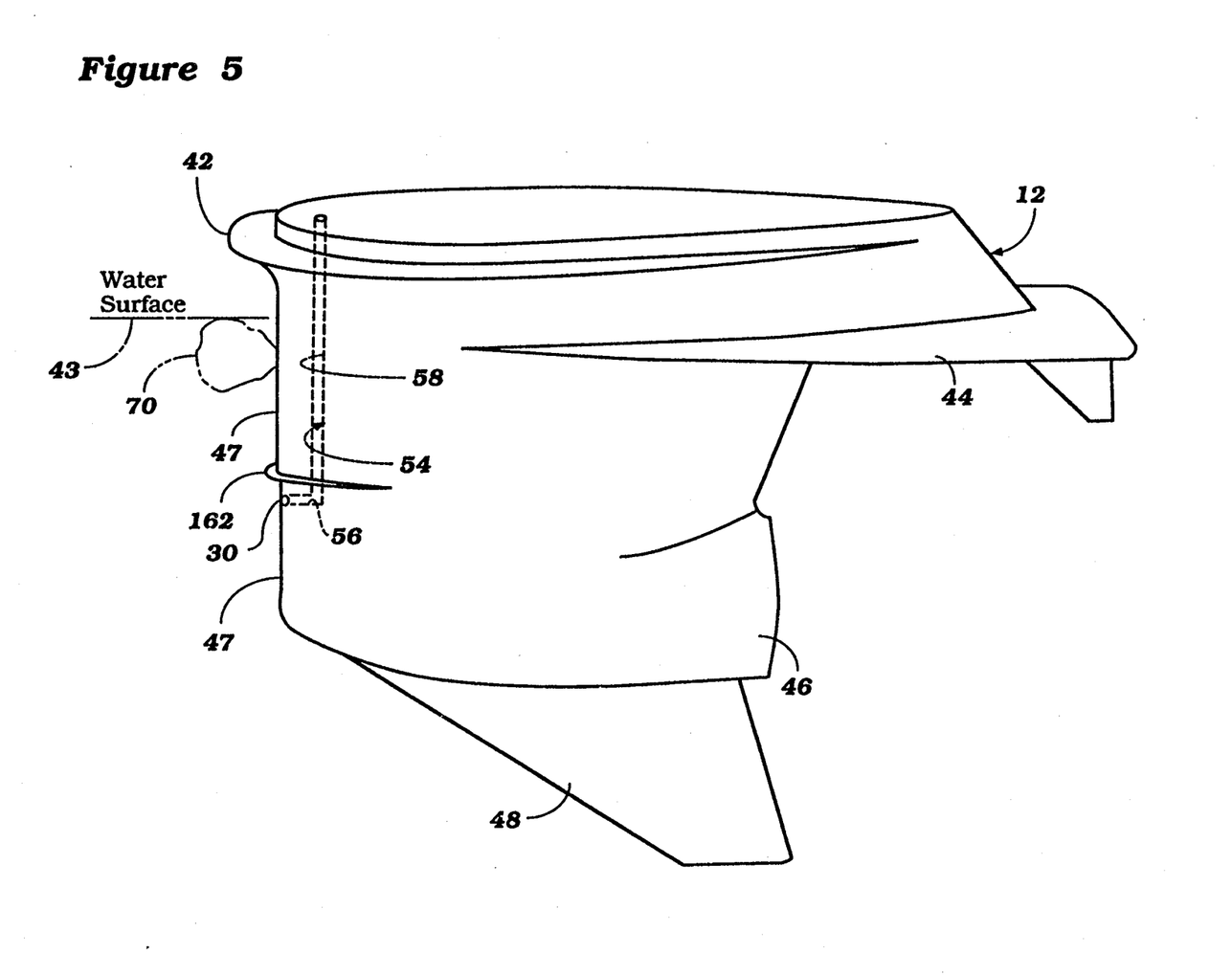
FIG. 5 is an exploded, perspective view showing a lower unit of an outboard motor and a portion of the vessel speed measuring system, as contemplated by a second embodiment of the invention.

FIG. 5 is a perspective view showing the lower unit 12 of the outboard motor 4, and a portion of the vessel speed measuring system, as contemplated by the second embodiment of the invention.

According to the second embodiment, the lower unit 12 is provided with a projection 162 rounding its leading edge 47. The projection 162 is formed as a generally horizontally disposed, basically U-shaped, thin, flat plate. As a result of such a construction, water debris (such as driftwood 70) impacting upon an upper region of the lower unit 12, and passing along the general pathway as described above with reference to FIG. 4, is similarly prevented from making contact with the pressure intake port 30, as it will be blocked and held forwardly outward of the port 30 by the projection 162 and the portion of the leading edge 47 just below the port 30, as it passes along this region.

Figure 6:
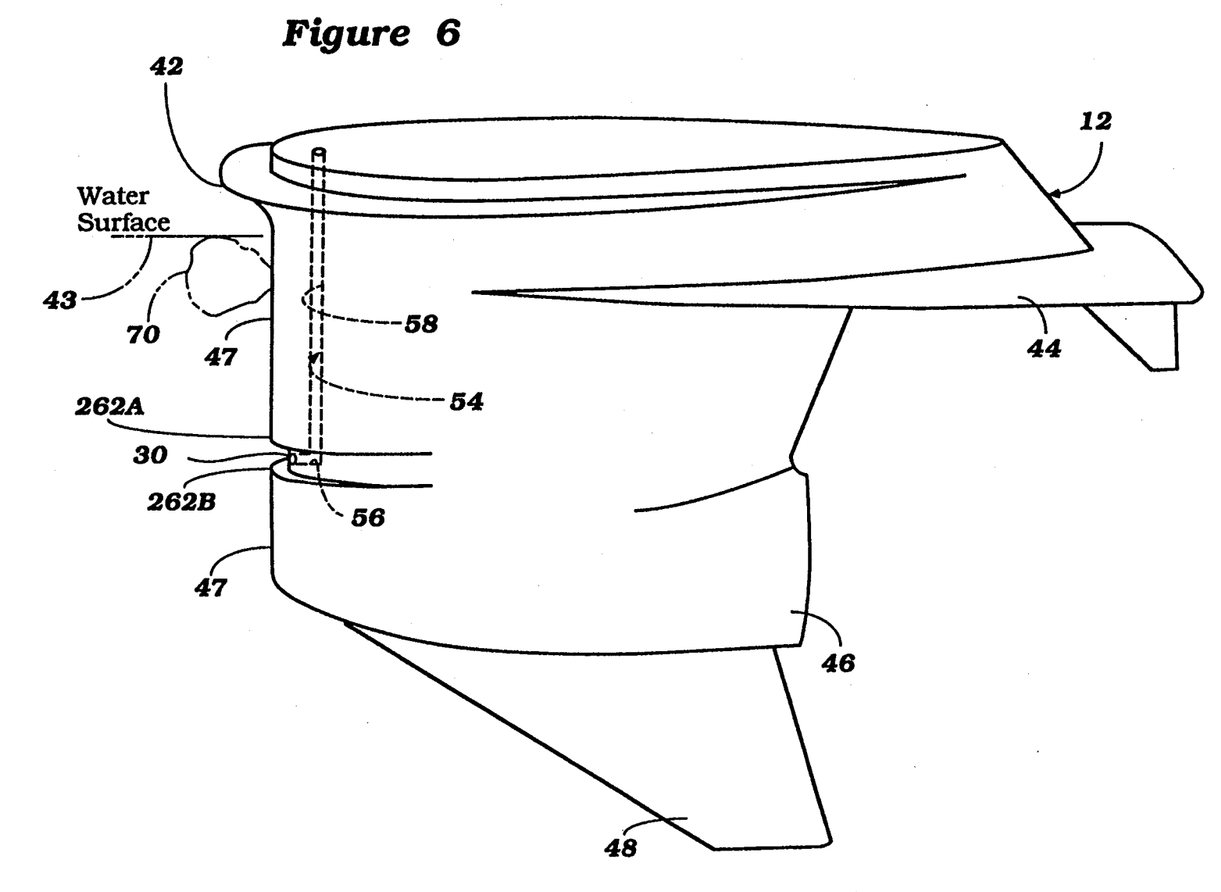
FIG. 6 is an exploded, perspective view showing a lower unit of an outboard motor and a portion of the vessel speed measuring system, as contemplated by a third embodiment of the invention.

FIG. 6 is a perspective view showing the lower unit 12 of the outboard motor 4, and a portion of the vessel speed measuring system, as contemplated by the third embodiment of the invention.

According to the third embodiment, the lower unit 12 is provided with a pair of forwardly projecting portions 262A and 262B for preventing water debris from contacting the pressure intake port 30. The projecting portion 262A is essentially the same in design as the projecting portion 62 of the first embodiment (FIG. 2). The projecting portion 262B is very similar to the portion 262A, except that the portion 262B is formed below the pressure intake port 30. As a result of such a construction, water debris (such as driftwood 70) impacting upon an upper region of the lower unit 12, and passing along the general pathway as described above with reference to FIG. 4, is not permitted to make contact with the pressure intake port 30, as it will be blocked and held forwardly outward of the port 30 by the projection 262A, as it approaches the region of the port 30, and then will additionally be blocked and held forwardly outward of the port 30 by the projection 262B as well, as it progresses downwardly and rearwardly along the lower unit 12.

Thus, according to the three embodiments set forth above, it will not be possible for a piece of driftwood, or similar water debris, to make direct contact with the pressure intake port 30. Accordingly, no fragment of such driftwood will be able to splinter off of the debris and become lodged in the port 30 and hinder the performance of the associated vessel speed measuring and indicating arrangement.

Figure 7:
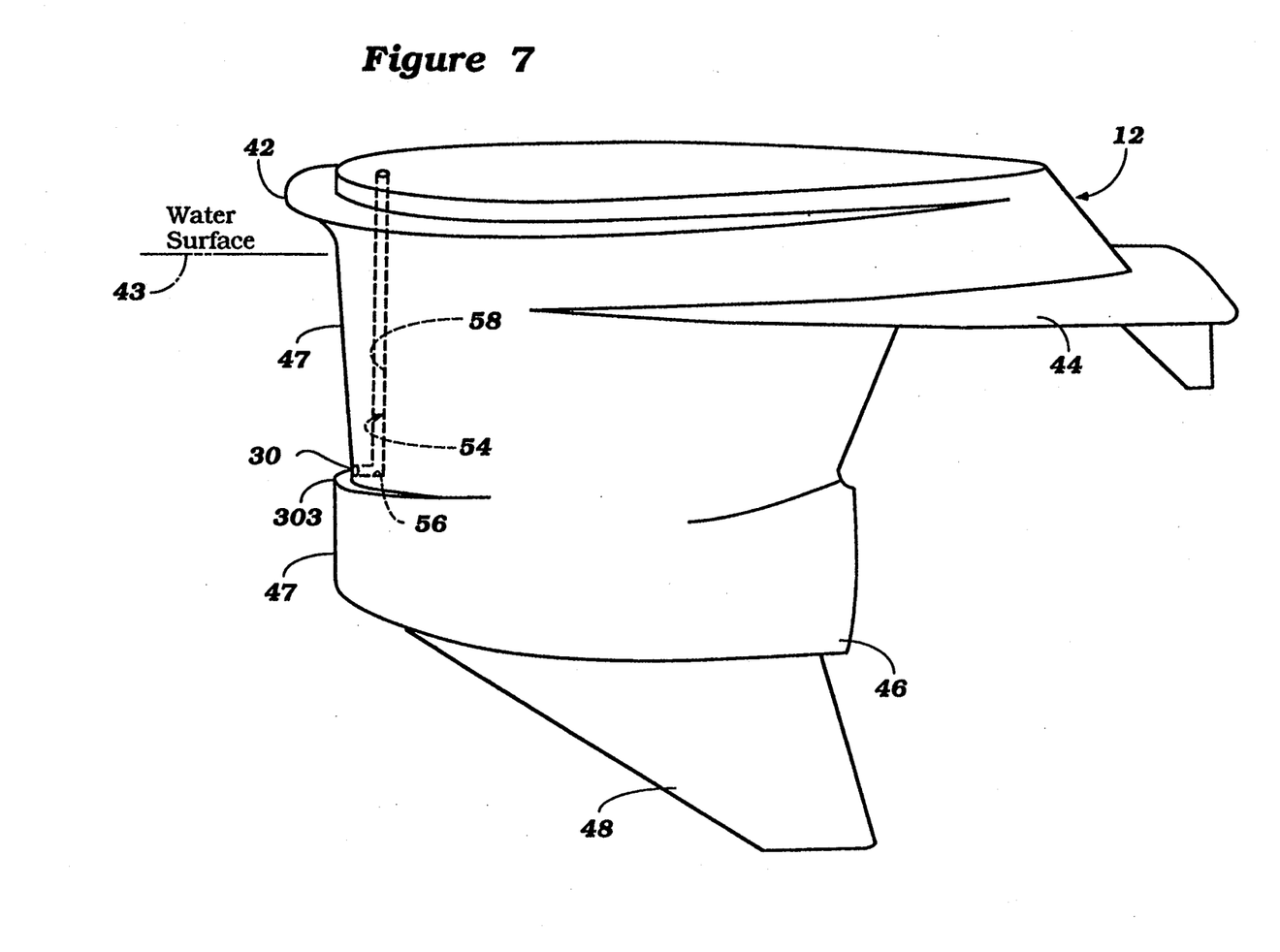
FIG. 7 is an exploded, perspective view showing a lower unit of an outboard motor and a portion of the vessel speed measuring system, as contemplated by a fourth embodiment of the invention.

FIG. 7 shows a fourth embodiment of the invention. In the fourth embodiment of the invention, a projecting portion 303 for preventing water debris from contacting the pressure intake port 30 is formed below the pressure intake port 30.

It is to be noted that a key feature which aids the present invention in achieving its object of preventing splintered pieces of debris from lodging in a forwardly opening pressure intake port upon an outboard unit of a watercraft propulsion arrangement is the construction wherein a projection is formed in the vicinity of the pressure intake port. The projection may be slightly above the pressure intake port, below the pressure intake port, or both above as well as below the pressure intake port. In order to perform optimally, however, it is important that the projection, wherever located, protrude in a direction forward and outward of the forwardmost edge of the outboard unit proximate the point whereat the pressure intake port is formed.

It is to be understood that the foregoing description is primarily intended to be exemplary, in particular to provide the preferred embodiments of the invention as contemplated by the inventor, and is not meant to be limiting. Accordingly, various changes and modifications may be made without departing from the spirit and scope of the invention, as defined by the appended claims.

It is claimed:

1. In a vessel speed measuring and indicating arrangement having a propulsion unit, an outboard portion of said propulsion unit, an intake port formed along a forward region of said outboard portion, an operator interfacing display assembly, and a line communicating said intake port with said display assembly, the improvement comprising a debris blocking projection formed in close proximity to said intake port and extending laterally forward of said intake port, wherein said debris blocking projection is operable to prevent pieces of debris from entering and lodging within said port.

2. The vessel speed measuring and indicating arrangement of claim 1 further comprising a splash plate provided upon said outboard portion above said intake port; and wherein said debris blocking projection is only formed at a location above said intake port and below said splash plate.

3. The vessel speed measuring and indicating arrangement of claim 2 wherein said debris blocking projection is a rather thin, plate-like, generally U-shaped element.

4. The vessel speed measuring and indicating arrangement of claim 3 wherein said debris blocking projection is formed integrally with said outboard portion.

5. The vessel speed measuring and indicating arrangement of claim 3 wherein both said debris blocking projection and said outboard portion are streamlined along a direction extending from the forwardmost region of said propulsion unit to the rearwardmost region of said propulsion unit.

6. The vessel speed measuring and indicating arrangement of claim 2 wherein said debris blocking projection extends from a point slightly above said intake port upwards, in a generally vertical direction, and comprises an upper leading, forward edge of said outboard portion.

7. The vessel speed measuring and indicating arrangement of claim 6 wherein said debris blocking projection is formed integrally with said outboard portion.

8. The vessel speed measuring and indicating arrangement of claim 6 wherein both said debris blocking projection and said outboard portion are streamlined along a direction extending from the forwardmost region of said propulsion unit, whereat they possess different cross-sectional areas, to the rearwardmost region of said propulsion unit, whereat they share an essentially equivalent cross-sectional area; and wherein these cross-sectional areas gradually blend to such essentially equivalent area progressively from said forwardmost region to said rearwardmost region of said propulsion unit.

9. The vessel speed measuring and indicating arrangement of claim 1 wherein said debris blocking projection is formed only beneath said intake port.

10. The vessel speed measuring and indicating arrangement of claim 9 wherein said debris blocking projection extends downwardly from a point slightly below said intake port and comprises a lower leading, forward edge of said outboard portion.

11. The vessel speed measuring and indicating arrangement of claim 10 wherein said debris blocking projection is formed integrally with said outboard portion.

12. The vessel speed measuring and indicating arrangement of claim 10 wherein both said debris blocking projection and said outboard portion are streamlined along a direction extending from the forwardmost region of said propulsion unit to the rearwardmost region of said propulsion unit.

13. The vessel speed measuring and indicating arrangement of claim 1 wherein said debris blocking projection is formed both above and beneath said intake port.

14. The vessel speed measuring and indicating arrangement of claim 13 wherein said debris blocking projection extends from a point slightly above said intake port upwards, in a generally vertical direction, and comprises an upper leading, forward edge of said outboard portion; and wherein said debris blocking projection additionally extends downwardly from a point slightly below said intake port and comprises a lower leading, forward edge of said outboard portion.

15. The vessel speed measuring and indicating arrangement of claim 14 wherein said debris blocking projection is formed integrally with said outboard portion.

16. The vessel speed measuring and indicating arrangement of claim 14 wherein both said debris blocking projection and said outboard portion are streamlined along a direction extending from the forwardmost region of said propulsion unit to the rearwardmost region of said propulsion unit.

17. The vessel speed measuring and indicating arrangement of claim 1 wherein said intake port is a water pressure intake port and said pressure intake port opens forwardly, with respect to said outboard portion, in a direction of forward advancement of said vessel; and wherein said line communicating said intake port with said display assembly is a water pressure line.

18. The vessel speed measuring and indicating arrangement of claim 17 wherein at least a part of said outboard portion extends below the surface of a body of water within which said vessel is operated; and wherein said input port is positioned along said outboard portion extending below the body of water.

19. The vessel speed measuring and indicating arrangement of claim 18 further comprising a tilt axis about which said outboard portion may pivot in response to a force generated when said outboard portion strikes debris during forward movement of said vessel.

20. The vessel speed measuring and indicating arrangement of claim 19 wherein said debris blocking projection is operable to block driftwood, both floating and partially submerged within the body of water within which said vessel is operated, from contacting said input port.

21. The vessel speed measuring and indicating arrangement of claim 20 wherein said operator interfacing display assembly is a speedometer having a pressure gauge including a Bourdon tube and an indicator.

22. The vessel speed measuring and indicating arrangement of claim 21 wherein said propulsion unit is an outboard motor.

23. The vessel speed measuring and indicating arrangement of claim 22 wherein said propulsion unit includes a drive shaft housing and a lower unit depending from said drive shaft housing; wherein said intake port extends rearwardly through a portion of said lower unit and then upwardly into said drive shaft housing.

24. A vessel speed measuring and indicating arrangement comprising a propulsion unit, an outboard portion of said propulsion unit, an intake port formed along a forward region of said outboard portion, and further comprising a debris blocking projection formed in close proximity above said intake port and extending laterally forward of said intake port, wherein said debris blocking projection is operable to prevent pieces of debris from entering and lodging within said port.

* * * * *